May 14, 1968 R. J. HARKENRIDER ETAL 3,383,617
ELECTRONIC PROPORTIONING CIRCUIT INCLUDING A LIGHT CONTROL MEANS IN THE AMPLIFIER CIRCUIT
Filed Nov. 25, 1964
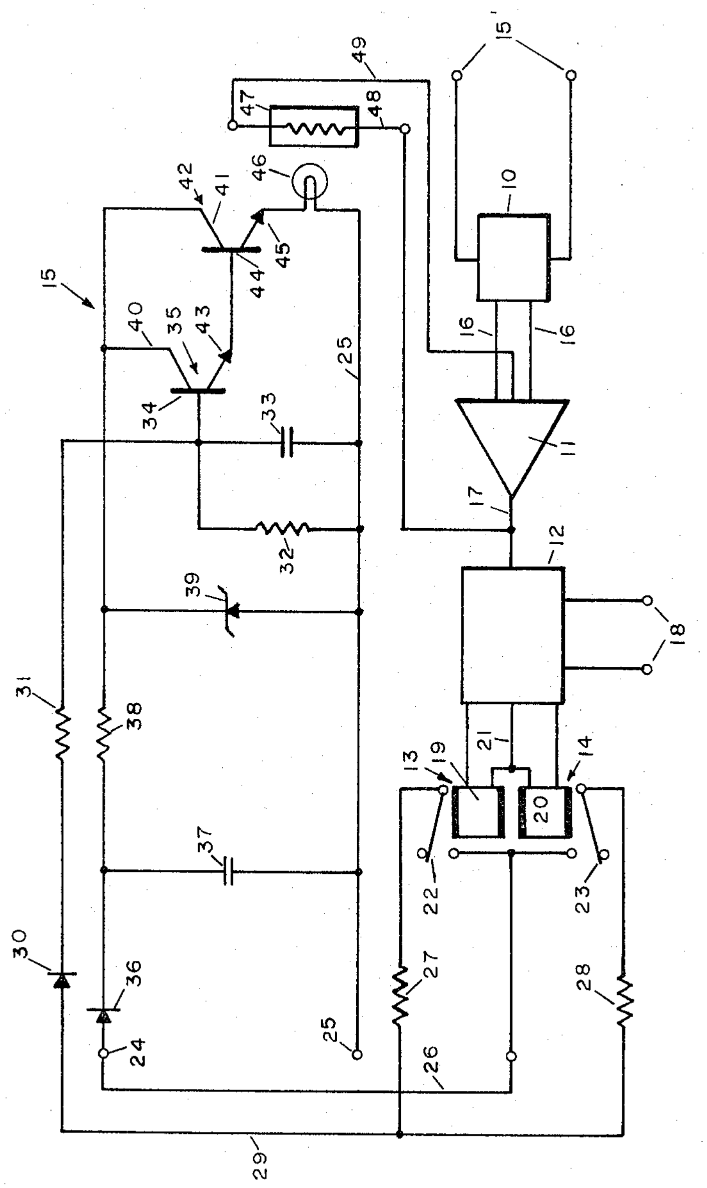
INVENTOR.
ROBERT J. HARKENRIDER
JOHN L. MOE
BY Richard J. Renk
ATTORNEY United States Patent Office 3,383,617
Patented May 14, 1968

3,383,617

ELECTRONIC PROPORTIONING CIRCUIT INCLUDING A LIGHT CONTROL MEANS IN THE AMPLIFIER CIRCUIT

Robert J. Harkenrider and John L. Moe, Winona, Minn., assignors to Wayneo, Inc., Winona, Minn., a corporation of Minnesota Filed Nov. 25, 1964, Ser. No. 413,806
6 Claims. (Cl. 330—59)

ABSTRACT OF THE DISCLOSURE

A time proportioning circuit is provided for controlling an environment whereby the control point is anticipated by the output of the circuit being turned off and on before the control point is actually reached. An "on" to "off" time relationship is established which adds small bursts of energy to the environment being controlled to maintain the environment at the desired control point. In operation, an error signal such as from a bridge is amplified and used to actuate a switching device. The switching device then actuates a negative feedback circuit. The negative feedback circuit includes means for gradually charging a circuit to actuate an energy sensitive element such as a light dependent resistor which gradually increases the negative feedback to cause the switch to de-energize. Should the environment be away from the control point, the switch will be again immediately actuated and the procedure repeated. The error signal or amplifier gain is then reduced as a function of time beginning with the switch being energized.

The present invention relates to electronic proportioning circuits and more particularly to time proportioning circuits.

A circuit of this type finds wide application in controlling various processes and temperatures where it is desirable to gradually reduce the input to a controlled environment as it approaches its control point thereby reducing "over" or "under" shooting effects and thus providing more accurate control.

In other words, in an on-off control circuit, time proportioning of the "on-time" provides an anticipation of the control point by turning off the process before the control point is actually reached. It then establishes an "on" to "off" time relationship which ideally adds small bursts of energy to the environment being controlled to keep it at the control point temperature. This contrasts with on-off control which has a peak-to-peak deviation on both sides of the control point, with the magnitude of the deviation depending on the time-constants of the environment being controlled.

Heretofore, various means have been used in an attempt to provide proportional control, including auxiliary heat sensitive resistors in bridge circuits which are susceptible to changes in resistance with changes in ambient temperature. Others have used expensive and space consuming servo-controlled potentiometers in the bridge circuit.

It is therefore a primary object of the invention to provide an "on-off" time-proportioning circuit which is independent of a bridge circuit.

Another object of the invention resides in a novel time-proportioning circuit which is unaffected by changes in ambient temperature.

A further object of the invention resides in a novel circuit which is inexpensive and compact.

Other objects of the invention will become apparent from the following description and the accompanying drawing wherein:

FIG. 1 is a schematic diagram of the circuit of the invention.

While the circuit is not limited in its application, it is particularly suited to temperature controllers and will be described in that connection herein.

Specifically, as shown in FIG. 1, the circuit broadly includes a bridge 10, an amplifier 11, a demodulator 12, switching devices in the form of relays 13 and 14, and a time-proportioning circuit indicated generally at 15. The time-proportioning circuit is connected to provide negative feedback to the amplifier 11 to gradually reduce the gain thereof as a function of time.

The bridge 10, shown in block diagram, is supplied by a voltage at 15′. One leg of the bridge is provided with a temperature sensing resistance element not shown.

When an unbalanced condition exists in the bridge, i.e., when the sensing element indicates that the environment being controlled requires heating or cooling, a signal is sent via conductors 16 to the amplifier 11. The amplified signal is fed through conductor 17 to the phase sensitive demodulator 12 which is also supplied with an A.C. reference voltage of generally 60 cycles per second through terminals 18. (However, different frequencies may be used depending on the other circuit components.)

Connected to the output of the demodulator are coils 19 and 20 for the respective relays 13 and 14 which have a common conductor 21 between them. Relay 13 is connected to close its contacts 22 when the bridge is unbalanced as a result of the temperature of the environment being lower than the control set-point thereby requiring additional heat. Energization of relay 13 also closes contacts not shown which are connected to a heating source not shown.

If the temperature of the environment being controlled is above the control set-point, cooling is required and the phase of the signal coming from the amplifier 11 will be reversed as compared to the signal calling for heat. This will actuate relay 14 and close contacts 23 and also contacts not shown connected to a cooling source.

When the bridge 10 is balanced as a result of the environmental temperature being at the control-point, both relays 13 and 14 will be de-energized.

Now, according to the present invention to provide time-proportioning of the heating or cooling energy being supplied to the environment being controlled, there is provided the circuit shown at 15. Such circuit aids in controlling the output of amplifier 11 to provide an anticipation of the control-point by adding small time bursts of energy so that the temperature of the environment will not over-shoot.

A source of power to the proportioning circuit 15 in the form of an A.C. line voltage (which in a typical circuit may be 120 volts, 60 cycles) is applied across terminals 24 and 25. Signal power for the circuit is taken from terminal 24, through a common conductor 26, through either of relay contacts 22 and 23, through one or the other of relay isolating resistors 27 and 28 and thence through another conductor 29 to rectifier 30. A charging resistor 31 is connected serially to the other side of rectifier 30 and thence to the junction of a resistor 32, a capacitor 33, and the base 34 of a transistor 35. Resistor 32 parallels capacitor 33, and both connect into common terminal conductor 25.

A D.C. supply voltage is furnished the circuit 15 by a rectifier 36 connecting to the A.C. terminal 24 which in turn is followed by a shunt connected filtering capacitor 37 coupled to common conductor 25. A dropping resistor 38 is connected serially to rectifier 36. On the other side rectifier 36 a Zener voltage regulating diode 39 is coupled in parallel to the common conductor 25.

Beyond the Zener, the collector 40 of the transistor 35 and the collector 41 of a transistor 42 also connect to the resistor 38. The transistors 35 and 42 are connected as a group in "Darlington" configuration as a high-gain-current amplifier with the emitter 43 of transistor 35 coupled directly to the base 44 of transistor 42. In this manner, current gains of 5,000 to 10,000 are realized and a high input resistance is presented at the base 34 of transistor 35 thus presenting negligible loading to the capacitor 33.

The output of transistor 42 through its emitter 45 is connected to an incandescent lamp 46. The other side of lamp 46 connects to common conductor 25.

Positioned in close proximity to the lamp 46 is an energy sensitive device in the form of a light-dependent-resistor (LDR) 47 wherein the resistance decreases as the light energy received increases. The LDR is connected in parallel by conductors 48 and 49 across the input and output of amplifier 11 as a negative feedback circuit. Thus, the amplifier gain is proportioned to the LDR's absolute resistance; that is, the higher the LDR resistance, the less signal shunted back as a negative feed-back signal and the greater the amplifier gain. The amplifier gain will therefore be an inverse function of time beginning with the instant one of the relays 13 or 14 energizes.

As an example of the operation of the time-proportioning circuit 15, power supplied from terminals 24 and 25 is rectified by rectifier 36 and filtered by capacitor 37. The voltage is then reduced in magnitude and regulated by dropping resistor 38 and Zener 39 (for this example, the drop is to about 20 volts). This latter voltage is applied to transistors 35 and 42.

Now, if either relay 13 or 14 is energized, relay contacts 22 or 23 will be closed and capacitor 33 will be charged through either resistor 27 or 28, thence through rectifier 30, charging resistor 31, and resistor 32. The time constant of the capacitor charging current can of course be changed by altering the various components.

As capacitor 33 charges, the voltage across it also appears across lamp 46 which gradually increases in brilliance. The light from lamp 46 is positioned to illuminate the LDR 47 and its resistance gradually decreases with the increase in light energy. The resistance of the LDR 47 thus varies inversely with the voltage of lamp 46.

As the LDR 47 decreases in resistance, a greater negative feedback signal is returned to the amplifier 11 reducing its gain. A reduction in gain of the amplifier decreases the output signal to demodulator 12; and after the signal strength drops below a predetermined level, the energized relay 13 or 14 will drop-out.

Carrying the operation further as relates to a time-proportioning temperature controller, assuming the environment being controlled is considerably cooler than the controller set-point, bridge 10 through the sensor not shown will be heavily unbalanced. The unbalanced bridge will send a strong signal to amplifier 11 and demodulator 12 thereby energizing, for example, heating relay 13 and closing its contact 22. This, as explained hereabove, completes the charging circuit for capacitor 33, and lamp 46 then gradually increases in brilliance thereby decreasing the resistance of LDR 47. A decrease in the LDR resistance permits a greater negative feedback signal to be fed to amplifier 11 which in effect opposes the signal from the bridge 10.

As the temperature of the controlled environment approaches its set-point, the bridge signal will gradually decrease. At the same time the negative feedback signal has increased because of the gradually increasing brilliance of lamp 46. Consequently, the negative feedback signal gradually over-powers the bridge signal. Thus, the amplifier output to the demodulator is reduced to a point where the relay 13 drops out. This condition exists before the temperature of the environment being heated reaches the set-point. Dropping-out of relay 13 and its contact 22 shuts off the power to capacitor 33 thereby causing lamp 46 to decrease in brilliance and increasing the resistance of LDR 47 providing a reduction in negative feedback to amplifier 11.

This results in an increased output from the amplifier to demodulator 12; if the temperature has not yet reached the set-point, the relay 13 will again energize to give another burst of heat energy. In this manner small bursts of heat energy are added before the set-point temperature is actually reached. Thus, a time-proportioning effect is achieved which provides an anticipation of the set-point.

Such action provides more accurate control than does an on-off controller which usually does not shut off until the set-point is actually reached, and because of the so-called inertia or latent heat of the heating elements cause the temperature to over-shoot or go beyond the temperature set-point. This of course can also occur as an environment is being cooled causing it to over-shoot to the colder side of the set-point. The magnitude of the peak-to-peak deviation about the control point in an on-off type controller of course depends on the time-constant of the process being controlled.

On the other hand, in the time-proportioning circuit of the invention, once the set-point has been reached, small time-bursts of energy are added to keep the environment at the static control point. The net result is that the peak-to-peak deviations about the control point are considerably reduced as compared to on-off control.

With a circuit of the type shown in FIG. 1, this may include both heating and cooling energy as may be required. However, the circuit may also be used with heating or cooling elements alone.

As another form of the invention, the energy sensitive element such as the light dependent resistor (LDR) 47 can be incorporated between the bridge 10 and the amplifier 11 to act in the nature of a variable attenuator. In this form the LDR would be connected in shunt across the conductors 16. In operation, as the light source 46 increases in brilliance, the LDR resistance would decrease thereby shunting a portion of the signal from the amplifier and reducing its output thereby eventually causing the energized relay to drop-out.

Also, while the invention has been shown using an A.C. bridge with a demodulator, it is evident that the concepts thereof may also be employed with a D.C. bridge and the demodulator as such would not be necessary. Moreover, in place of the light-dependent-resistor concept, other energy sensitive devices may be used which change their electrical resistance to current flow when subjected to changes in the amount of external energy applied thereto such as magnetic flux sensitive Hall devices, field effect transistors, heat sensitive resistors including both the positive and negative coefficient of resistance types, etc. In the case of a heat sensitive resistor, an energy source in the nature of a small auxiliary heating element actuated by one of the relays 13 or 14 and positioned in close proximity to the resistor would be substituted for the charging circuit 15.

In other forms, an energy sensitive resistance element can be placed in the common electrode circuit of a control device of the amplifier 11 to provide negative feedback, such as in the emitter circuit of a transistor to vary the amplifier output in response to the amount of energy applied to the energy sensitive element by an external energy source. Also, an energy sensitive element can be placed in series in one of the conductors 16 to vary the signal from the bridge 10 to the amplifier 11. For this application, a heat sensitive resistor having a positive coefficient of resistance which increases in resistance with an increase in temperature has worked satisfactorily. Conversely, a heat sensitive resistance element having a negative coefficient of resistance (decreases in resistance with increase in temperature) can be connected in shunt across the conductors 16.

In summation, the invention broadly utilizes an energy sensitive resistance element, such as the light dependent resistor, heat sensitive resistor, flux sensitive device, etc.

to vary the signal being amplified and thus the amplifier output in relation to the time and amount of external energy applied to the resistance element by an external energy source such as a light source, heating source, flux source, etc.

It is, of course, to be understood that the form of the invention disclosed herein is to be taken as the preferred embodiment thereof, and that various changes and modifications may be made without departing from the spirit of the invention or the scope of the following claims.

What we claim is:

1. A proportioning circuit including:
(a) a signal source,
(b) an amplifier connected to said signal source,
(c) a switching device operably connected to said amplifier and adapted to be actuated thereby,
(d) an energy source operably connected to said switching device and adapted to be energized upon actuation of said switching device,
(e) said energy source having means connected thereto for gradually increasing the energy said source supplies as a function of time beginning with said switch being actuated, and
(f) an energy sensitive element which changes in its electrical resistance when external energy is applied thereto, said energy sensitive element being operably connected to gradually reduce the output of said amplifier as a function of time upon energization of said switching device and eventually cause said switching device to de-energize.

2. A proportioning circuit as claimed in claim 1, wherein said energy sensitive element is a heat-sensitive resistor.

3. A proportioning circuit as claimed in claim 2, wherein said energy sensitive element is a flux sensitive device.

4. A time proportioning circuit for providing an anticipation of a control point by turning off before the control point is reached and then adding small bursts of energy to gradually bring an environment being controlled to such control point and then keep it at such point by continuing to add bursts of energy comprising,
(a) an error signal source for providing an error signal when said environment is not at the control point,
(b) a switching device operably connected to said error signal source to energize when said error signal is at a pre-determined level,
(c) negative feedback means independent of said error signal source for reducing the error signal as a function of time connected to and being activated by said switching device,
(d) said negative feedback means including an energy sensitive element and means for transferring energy to said energy sensitive element, said transferring means being actuated when said switch is energized and acting to gradually increase the energy transferred to said energy sensitive element to provide a gradually increasing reduction in said error signal until said error signal to said switching device is reduced to the pre-determined level whereupon said switching device is de-energized and whereupon said energy sensitive element is de-activated, and then, if said error signal is still above said pre-determined level said switching device is again energized and said negative feedback means is again gradually re-activated.

5. A time proportioning circuit as claimed in claim 4 wherein said negative feedback means includes an energy sensitive element in the form of a light dependent resistor, and said energy transferring means includes a light source positioned in close proximity to said light dependent resistor and a charging circuit connected to said switch, said charging circuit being activated by actuation of said switching device to gradually cause the brilliance of said lamp to increase and thereby reduce the resistance of said L.D.R. and increase the negative feedback signal and reduce the error signal to said switching device.

6. A time proportioning circuit as claimed in claim 4 wherein two switching devices are provided, one of which is operable when the environment being controlled is above the control point and the other operable when the environment being controlled is below the control point, both of said switching devices being operably connected to said error reducing signal means.

References Cited

UNITED STATES PATENTS

| | | | |
|---|---|---|---|
| 3,087,120 | 4/1963 | Schoellhorn et al. | 330—59 |
| 3,225,304 | 12/1965 | Richards | 330—28 |
| 3,281,723 | 10/1966 | Mercer | 307—88.5 |

ROY LAKE, *Primary Examiner.*

NATHAN KAUFMAN, *Examiner.*